United States Patent
Orkin et al.

(10) Patent No.: US 10,818,293 B1
(45) Date of Patent: Oct. 27, 2020

(54) SELECTING A RESPONSE IN A MULTI-TURN INTERACTION BETWEEN A USER AND A CONVERSATIONAL BOT

(71) Applicant: Drift.com, Inc., Boston, MA (US)

(72) Inventors: Jeffrey D. Orkin, Arlington, MA (US); Christopher M. Ward, Somerville, MA (US)

(73) Assignee: Drift.com, Inc., Boston, MA (US)

( * ) Notice: Subject to any disclaimer, the term of this patent is extended or adjusted under 35 U.S.C. 154(b) by 0 days.

(21) Appl. No.: 16/928,892

(22) Filed: Jul. 14, 2020

(51) Int. Cl.
| | |
|---|---|
| G10L 15/22 | (2006.01) |
| G10L 15/32 | (2013.01) |
| G10L 15/06 | (2013.01) |
| G06F 16/9032 | (2019.01) |
| G06F 16/901 | (2019.01) |
| G06F 16/338 | (2019.01) |
| G06F 9/54 | (2006.01) |
| G06F 16/9038 | (2019.01) |
| G06F 40/35 | (2020.01) |

(52) U.S. Cl.
CPC .............. G10L 15/22 (2013.01); G06F 9/542 (2013.01); G06F 16/338 (2019.01); G06F 16/9017 (2019.01); G06F 16/9038 (2019.01); G06F 16/90332 (2019.01); G06F 40/35 (2020.01); G10L 15/063 (2013.01); G10L 15/32 (2013.01); *G10L 2015/0631* (2013.01)

(58) Field of Classification Search
CPC .................................. G10L 15/22; G06F 40/35
See application file for complete search history.

(56) References Cited

U.S. PATENT DOCUMENTS

| | | | |
|---|---|---|---|
| 10,482,874 B2* | 11/2019 | Thomson | G10L 15/1822 |
| 2015/0142420 A1 | 5/2015 | Sarikaya et al. | |
| 2016/0042735 A1* | 2/2016 | Vibbert | G10L 15/222 704/257 |
| 2016/0154792 A1 | 6/2016 | Sarikaya et al. | |
| 2016/0188565 A1 | 6/2016 | Robichaud et al. | |
| 2016/0217124 A1 | 7/2016 | Sarikaya et al. | |

(Continued)

OTHER PUBLICATIONS

Orkin, Jeffrey David, "Collective artificial intelligence: simulated role-playing from crowdsourced data," Doctoral Thesis, Massachusetts Institute of Technology, Feb. 2013.

(Continued)

*Primary Examiner* — Douglas Godbold
(74) *Attorney, Agent, or Firm* — David H. Judson

(57) ABSTRACT

A method to select a response in a multi-turn conversation between a user and a conversational bot. The conversation is composed of a set of events, wherein an event is a linear sequence of observations that are user speech or physical actions. Queries are processed against a set of conversations that are organized as a set of inter-related data tables, with events and observations stored in distinct tables. As the multi-turn conversation proceeds, a data model comprising an observation history, together with a hierarchy of events determined to represent the conversation up to at least one turn, is persisted. When a new input (speech or physical action) is received, it is classified using a statistical model to generate a result. The result is then mapped to an observation in the data model. Using the mapped observation, a look-up is performed into the data tables to retrieve a possible response.

19 Claims, 3 Drawing Sheets

(56) References Cited

U.S. PATENT DOCUMENTS

| | | | |
|---|---|---|---|
| 2016/0328270 A1 | 11/2016 | Bikkula et al. | |
| 2017/0091171 A1* | 3/2017 | Perez | G06F 40/35 |
| 2017/0351765 A1 | 12/2017 | Reddy et al. | |
| 2017/0353405 A1 | 12/2017 | O'Driscoll et al. | |
| 2017/0364505 A1 | 12/2017 | Sarikaya et al. | |
| 2018/0024994 A1 | 1/2018 | Sarikaya | |
| 2018/0060303 A1* | 3/2018 | Sarikaya | G10L 15/063 |
| 2018/0077088 A1 | 3/2018 | Cabrera-Cordon et al. | |
| 2018/0090141 A1* | 3/2018 | Periorellis | G10L 15/1815 |
| 2018/0121415 A1* | 5/2018 | Perez | G10L 15/08 |
| 2018/0176385 A1 | 6/2018 | Raghav et al. | |
| 2018/0181558 A1 | 6/2018 | Emery et al. | |
| 2018/0357221 A1* | 12/2018 | Galitsky | G06F 40/205 |
| 2019/0012373 A1 | 1/2019 | Malik et al. | |
| 2019/0012390 A1 | 1/2019 | Nishant et al. | |
| 2019/0103107 A1* | 4/2019 | Cohen | G10L 15/22 |
| 2019/0188590 A1 | 6/2019 | Wu et al. | |
| 2019/0251169 A1* | 8/2019 | Loghmani | G06F 40/30 |
| 2019/0304157 A1* | 10/2019 | Amer | G06N 3/0445 |
| 2019/0324553 A1* | 10/2019 | Liu | G06F 16/3323 |
| 2020/0081939 A1 | 3/2020 | Subramaniam | |
| 2020/0099633 A1 | 3/2020 | D'Agostino et al. | |
| 2020/0152184 A1* | 5/2020 | Steedman Henderson | G06N 3/08 |

OTHER PUBLICATIONS

Raman, et al, "Constant-time query processing," ICDE, 2008.

* cited by examiner

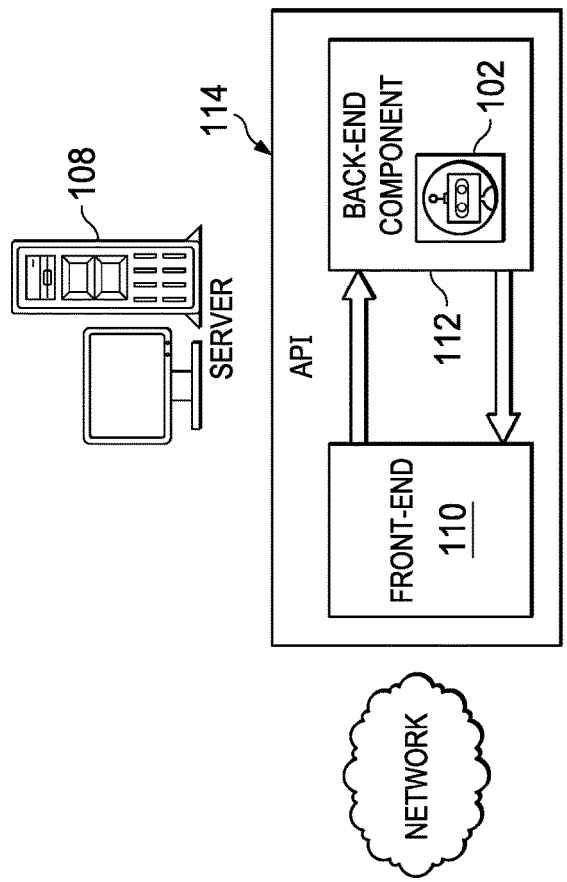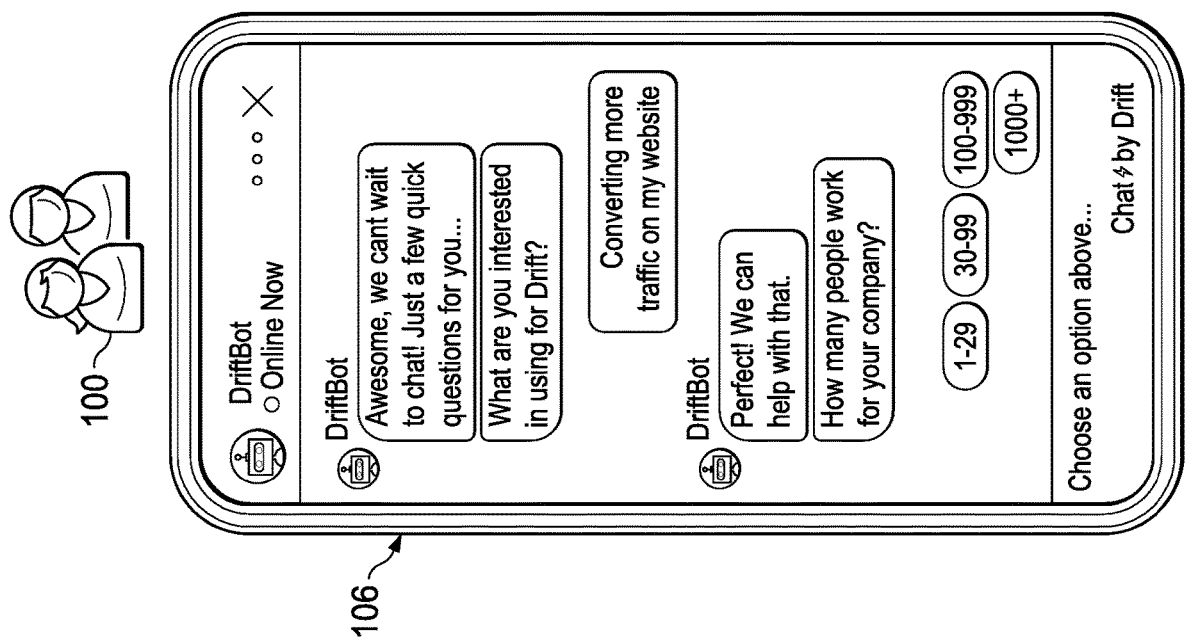
FIG. 1

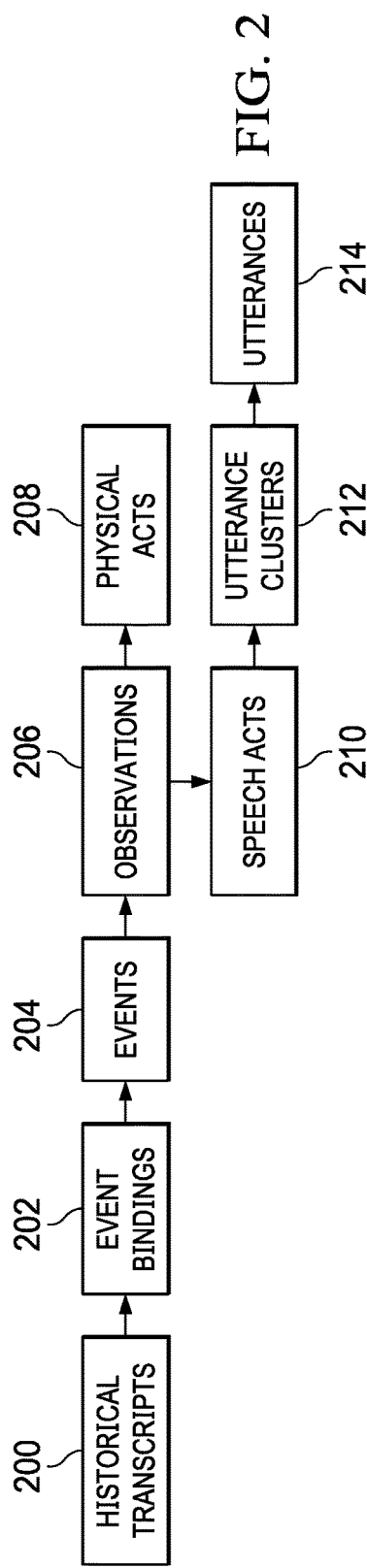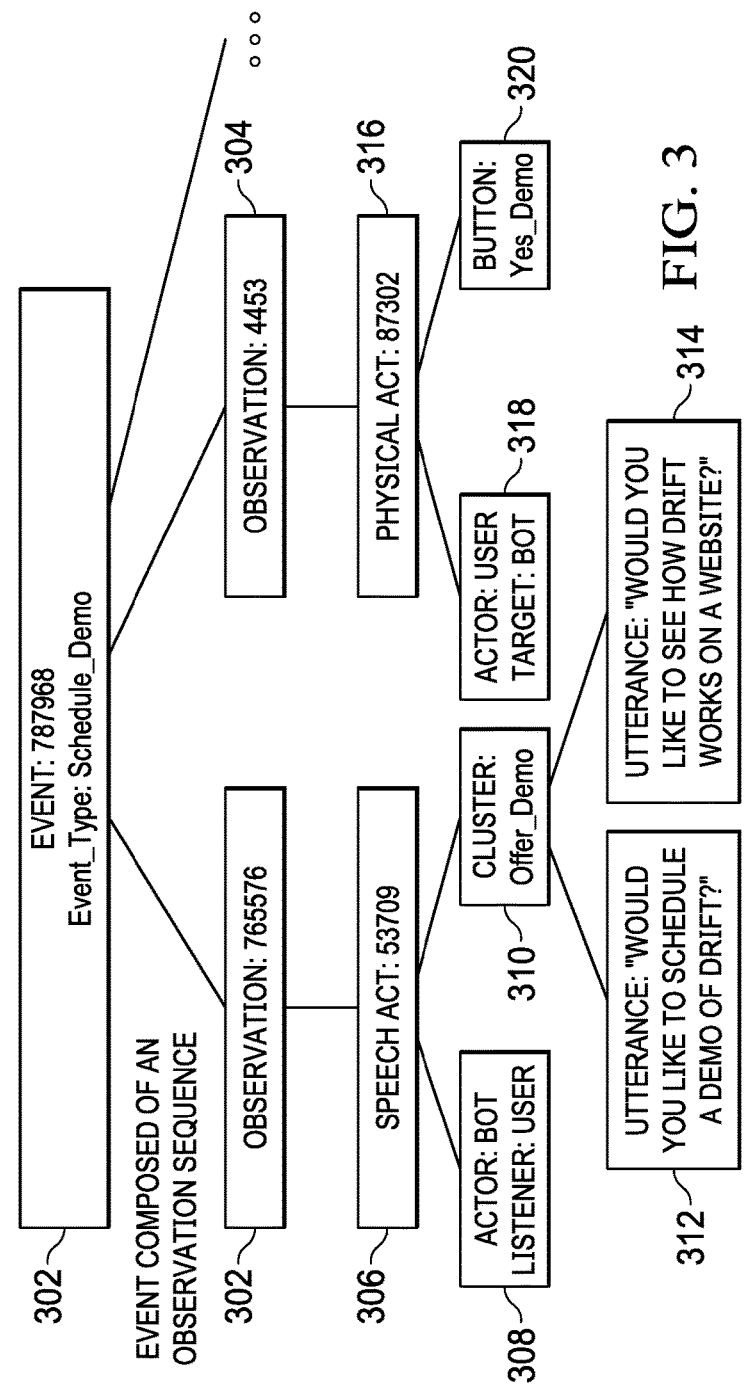

SELECTING A RESPONSE IN A MULTI-TURN INTERACTION BETWEEN A USER AND A CONVERSATIONAL BOT

BACKGROUND

Technical Field

This application relates generally to information retrieval methods and systems.

Background of the Related Art

Online conversational marketing is a well-known technique designed to move buyers or prospects through marketing and sales funnels through the power of real-time conversations. In this approach, and instead of forcing users to go through lead capture forms and wait days for a response, conversational marketing uses targeted messaging, live chat and intelligent conversational bots (chatbots) to engage with users in real-time when they visit a website. A chatbot is a software application that executes on the site and that is used to interact with the user, often in lieu of a direct human interaction. Typically, conversational bots are of several types. A rules-based chatbot follows pre-designed rules that form a decision tree. A more sophisticated approach is an Artificial Intelligence (AI)-based chatbot. An AI chatbot can understand language outside of a closed set of pre-programmed recognized inputs, and it has the capability to learn based on the inputs it receives. It can also make changes based on patterns, and it can become smarter over time as new situations are experienced. This type of chatbot can be applied to a range of uses, e.g., providing alternatives to human representatives, sentiment analysis, making predictions about what a visitor is looking for on a website, learning and adapting to user preferences, and others.

Although AI-based chatbot solutions provide significant advantages, most available commercial chatbot solutions focus on one-shot (single turn) interactions. Accordingly, as a conversation between the user and the conversational bot proceeds through multiple turns, it becomes increasingly difficult for the system to provide coherent responses to user inputs, especially where such inputs may include both speech and physical actions (e.g., button clicks, calendar selections, and the like) or combinations thereof. A further problem is that even well-trained AI-based chatbots have difficulty facilitating multi-turn conversations due to sparsity in training data; as the number of turns increases, it becomes much less likely that the system has an example in the data of every possible sequence, and thus coherent responses to follow-on inputs quickly become unavailable.

Additionally, many commercial AI-based interactive bots of this type (e.g., Apple® Siri, Amazon® Alexa, Google® Dialogflow, and the like) use an intent-based design, wherein the AI is used to infer intent, and then the bot carries out the intent using scripted content, or a slot-filling strategy. This intent-driven approach locks the user into one context at a time, which limits the ability of the bot to respond to unexpected information or turns in the conversation that switch between or among contexts.

BRIEF SUMMARY

A method and computing platform provides query understanding to select a response in a multi-turn conversation between a user and a conversational bot. According to one aspect of this disclosure, the conversation is composed of a set of events, wherein an event is composed of a linear sequence of observations that are user speech (e.g., transcribed audio, or typed text) or physical actions and that represent an expression of the event. Preferably, the platform processes the query against a set of annotated historical conversations that are organized as a set of inter-related data tables, with at least events and observations stored in distinct tables for computational efficiency. As the multi-turn conversation between the user and the conversational bot proceeds, the system persists a data model comprising an observation history, together with a hierarchy of events that have been determined to represent the conversation up to at least one turn. An observation is uniquely associated with one event, but one or more events may overlap in time such that multiple events may be active concurrently.

When a new speech input is received from the user, it is classified, e.g., using a machine learning-based statistical model, to generate a result. A new input that is a physical action typically is discretely recognized. The result (whether obtained from speech or physical action) is then mapped to an observation in the data model. Using the mapped observation as key, preferably a constant-time look-up is performed into the set of inter-related tables to retrieve a set of candidate interpretations (of the new user input) given the conversation up to at least one turn. Typically, a candidate interpretation (of the mapped observation) is one that either extends an event or starts a new event. When a given one of the set of candidate interpretations is determined to extend an event in the set of events, the mapped observation is appended to the event to create an extended event. When, however, and based on the set of candidate interpretations it is not possible to extend an existing event, the mapped observation may then be used to start a new event. When none of the candidate interpretations of the mapped observation is determined to extend an event or to start a new event, preferably the system identifies at least one other event whose event expression is a closest inexact match to an existing event, and identifies the other event as an "aliased" event. From the system's perspective, the aliased event is an actual event in the set of events, although it is actually spoofing some other event, typically, a closest inexact matching event. Another constant-time look-up into the set of inter-related data tables is then performed using one of: the extended event, the new event, and the aliased event, to retrieve a response. Preferably, the response comprises one or more possible next observations. The system then validates a possible next observation to ensure that it is a coherent response with respect to the conversation history so far. The conversational bot then returns a validated possible next observation to the user to facilitate a follow-on turn of the multi-turn conversation.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 1 is a block diagram depicting an information retrieval system in which the technique of this disclosure may be implemented;

FIG. 2 is a block diagram of a relational database comprising a set of inter-related data tables in which a corpus of annotated conversation transcripts is organized to provide storage-efficient informational retrieval according to one aspect of this disclosure;

FIG. 3 depicts a representative data model that is persisted in a database and represents a conversational history for a particular user-chatbot conversation or session over one-to-many turns.

DETAILED DESCRIPTION

Figure 4:
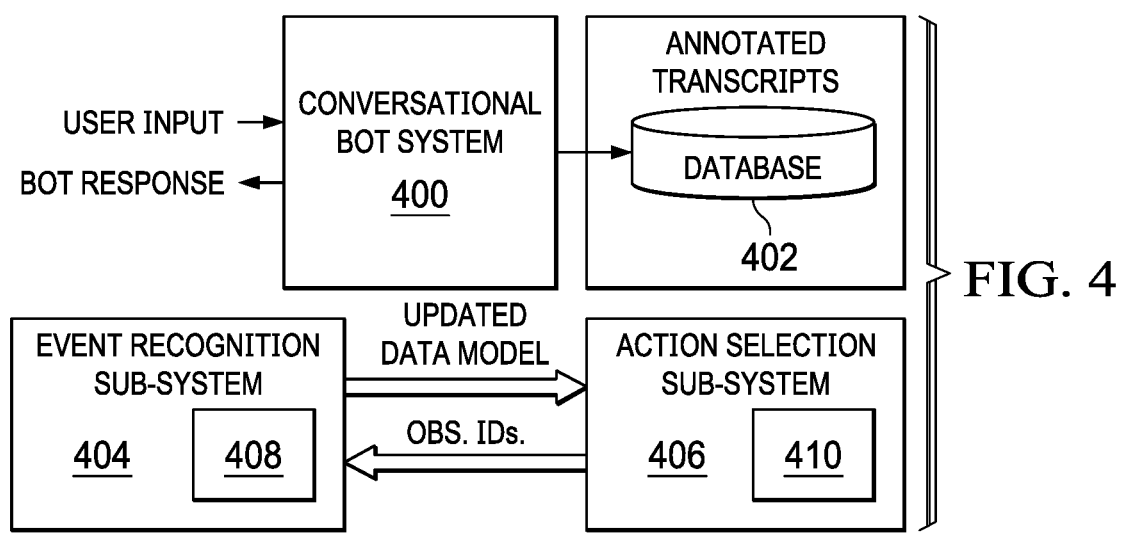
FIG. 4 depicts a representative system interaction showing processing of a user query according to an embodiment of this disclosure.

The following is a glossary of terms that are used herein:

Event: a sequence of observations, recognizable as a coherent behavior. Observations within the sequence can be an arbitrary mix of speech acts and physical acts, from multiple actors. One event can be represented by many different possible expressions of that event.

Event expression: one specific sequence of one or more observations that can represent some event. An event may unfold in many different ways, i.e., there may be many different sequences of saying things, and taking physical actions.

Event recognition: inferring which event is unfolding, or has unfolded, by comparing a sequence of observations to sequences that compose the expressions for some event.

Event aliasing: inferring which event is unfolding, or has unfolded, with an inexact match. When an exact sequence is not recognized, a closest inexact match can be determined and presented as an alias such that further processing can then be performed as if the closest inexact match was recognized as a known sequence.

Observation: an atomic action taken by an actor. Each action may be a physical act or a speech act. One or more observations may be intermingled between or among events as the events unfold in parallel, in which case the events themselves are active (in time) concurrently. Each observation is a member of one event, but as noted events can overlap in time, e.g., given observations 1-4, observations 1 and 3 may be part of event 1, while observations 2 and 4 may be part of event 2, such that events 1 and 2 are both active over a time period. As this example shows, observations from different events may be arbitrarily sequenced among observations from other events.

Physical act: a non-linguistic action taken by an actor, e.g., clicking a button or a link on a Graphical User Interface (GUI), entering data in a form, or the like. A physical act also may be received via more sophisticated data entry mechanisms, such as a gesture-based interface that reads and interprets facial expressions, biometric devices that receive and interpret physical features or movements, etc.

Speech act: an utterance expressed by one actor to another, in natural language. A speech act has some purpose for expressing it, and typically it can be expressed in many different ways to accomplish the same thing. The utterance may be typed text (e.g., in a chat window), transcribed from spoken audio, or the like.

Utterance: a sequence of words that is grammatically complete; usually one sentence.

Multi-turn conversation: typically, an interaction between end user participating in a chat, and a conversational bot, typically over multiple question and answer cycles. A multi-turn conversation may involve more than one human user, and more than one bat. For example, a hot may be configured to talk to multiple users concurrently (e.g., participants in a Zoom® web conference).

FIG. 1 depicts a representative information retrieval system in which the techniques of this disclosure may be implemented. In one embodiment, and which is not intended to be limiting, a multi-turn conversation is carried out between an end user 100, and a conversational bot software application 102 that executes in a network-accessible computing platform 104. The end user 100 is a human being that interacts with the platform, typically using a client machine 106 having a browser or mobile application (app). In a typical user case, the software application 102 executes in association with a website 108, although the chatbot functionality may be utilized by multiple distinct websites operated by separate and independent content providers. As such, the computing platform provides the chatbot functionality in a multi-tenant operating environment, although this is not a requirement. The user provides input to the chatbot as speech, as one or more physical actions (e.g., selecting a button or link, entering data in a field, etc.), or as some combination of speech and physical action. The chatbot 102 herein is an AI-based conversational bot. As depicted in FIG. 1, preferably the platform is configured with a network-accessible front end component 110, together with an Application Programming Interface (API)-accessible back-end system 112. The API is depicted at 114. The back-end system executes an instance of the software application 102 for each multi-turn conversation and, in particular, it provides both an understanding of a user's query (a speech and/or physical input), as well as a possible response to this query. Typically, the front-end system handles inputs from multiple end users that access the platform, and individual responses as determined by the back-end system (and in particular the software application instance that is managing the particular multi-turn conversation) are passed from the back-end to the front-end for delivery to the end user. In the context of a chatbot, the response typically is provided in a chat window.

Preferably, during a multi-turn conversation between the user and the conversational bot, it is desired that the system responds to a user input in less than a given time period (e.g., a few seconds) given network latency and transit time, and that such response is both correct and coherent with respect to the history of the conversation so far, i.e., the history of previous utterances or physical actions by the user. To this end, and according to a first aspect of this disclosure, information against which a query is processed preferably is organized in a particular manner. This information typically is a corpus of historical conversation transcripts that are first annotated (e.g., by human analysts) to provide an information database, e.g., queries and associated responses, that have been generated by the system previously. The nature and scope of the annotations are implementation-specific, but the notion is that the database provides a large corpus of possible conversational flows that the system may then use during a real-time multi-conversation between the user and the chatbot.

According to this disclosure, and as shown in FIG. 2, preferably the conversational transcripts 200 are annotated and then re-organized into a set of inter-related data tables that are structured in a specific manner to enable the system to make fast, discrete comparisons between a live conversation (i.e., a current one) and a corpus of conversions that have been seen in the past (i.e., the annotated historical conversations). This re-organization is sometimes referred to herein as packing. The set of data tables comprises an event bindings table 202, an events table 204, an observations table 206, a physical acts tables 208, and a speech acts table 210. The event bindings 202 table stores a set of event bindings, which are entities that connect lines of transcripts with whatever events these lines have been annotated to represent in the transcript. The events table 204 stores pointers to events, wherein an event typically is composed of a linear sequence of observations that represent an expression of the event. The observations table 206 stores pointers to observations that are either physical acts in the physical acts table 208, or speech acts in the speech acts table 210. As will be described, information in the relational database is searched in response to physical acts or speech acts, and the latter typically are organized as clusters of utterances 212. As defined above, an utterance 214 typically is a grammatically-complete set of words, nominally a complete sentence. Thus, and as depicted, the event bindings (event expressions) point to events, which point to the observations, either physical or speech acts. As will be described, this layout of the relational database enables the system to place an utterance or user action into its appropriate context in a highly-efficient manner, thereby giving the user input meaning within the conversational flow. In particular, the tables allow the system to efficiently search for all instances of an utterance or action (speech or physical act) within the annotated transcripts. Typically, the relational database tables are continually updated as the system interacts with end users; in one embodiment, the data tables are repacked periodically, e.g., every 10-20 minutes, although this is not a requirement.

Efficient querying according to the techniques herein is facilitated by representing observations as either speech or physical acts, and which are taken by either actor (conversation participants), and that are fluidly intermixed to form events. To this end, and according to a further aspect of this disclosure, as a multi-turn conversation proceeds, the system generates and persists in memory a data model (or, more generally, a data structure) that represents a conversation history between the user and the bot. Generally, the data model comprises an observation history, together with a set of events that have been determined to represent the conversation up to at least one turn. FIG. 3 depicts an example of one such data model. As depicted, event 302 has a particular event identifier "787968," which is an entry in the events table. The event has a particular type, in this example "Schedule_Demo." Based on the conversation so far, the event is composed of a sequence of observations (looking left to right) including an observation 302 (identifier "765576," which is an entry in the observations table), and observation 304 (identifier "4453," which is another entry in the observations table). Observation 302 points to a speech act 306 (identifier "53709," which is an entry in the speech acts table), which speech act in turn is associated to the conversation participants 308, in this case wherein the "actor" is the bot and the "listener" is the user. As also indicated, the speech act 306 has been associated to an utterance cluster 310, in this example the "Offer_Demo." In this example, the utterance cluster is common to utterances 312 and 314 (e.g., "Would you like to schedule a demo?" or "Would you like to see how the app works on a website?). Although just two utterances are depicted for the cluster, there may be any number of utterances. The entities 302, 306, 308, 310, 312 and 314 thus comprise a hierarchical representation of a first observation in the sequence of observations that comprise the event, and this activity is implemented by the chatbot.

More generally, utterances such as described preferably are used as training data for a machine learning (ML)-based statistical classifier; upon training, the classifier is then useful for both checking for exact matches, as well as for further generalization, i.e., finding other wordings that have a similar meaning to words and phrases recognized by the classifier.

Referring back to FIG. 3, the second observation 304 represents the user's response to what in this example is a prompt from the bot In particular, the observation 304 is associated with physical act 316 having identifier "87302," which is another entry in the observations data table. In this portion of the tree, conversation participants are reversed, such that in entity 318 the "actor" is the user, and the "target" of the physical act is the bot. As also depicted, physical act 316 also points to a particular button 320, representing the user responding that he or she wants to see the demonstration (the "Yes_Demo" action). The data model continues (on the right) with the next follow-on observation, e.g., an utterance by the user, another physical act, and so forth.

As can be seen then, the data model represents each event as being composed of an observation sequence, which is sometimes referred to herein as an observation history. As the data model is persisted (and in the depicted tree grows right-ward), the conversation history between the user and the bot is represented. In particular, and at any point in the multi-turn conversation, the data model comprises the observation history, namely, a hierarchical set of events that have been determined to represent the conversation up to at least one conversation turn (and typically many turns). More specifically, the data model is the observation history (everything said, and every button clicked, since the beginning of the conversation), and a tree of events that the system has overlaid on top of the observations to represent the system's best guess at explaining how a linear sequence of observations breaks down into coherent fragments of conversation. Persisting a data model that is built in this manner (and based on both utterances and physical actions) provides significant advantages because real conversations do not always unfold neatly into a linear sequence of topics. Instead, often they are typically quite messy, fluidly oscillating between several topics.

According to a further aspect of this disclosure, the data model keeps track of any number of events, all of which can be actively "extended" at any time. As described herein, an event can be extended when appending an identified observation creates a new sequence of observations that exactly matches an existing event expression. Thus, an event can be extended if appending the most recent observation creates a new (longer) sequence that exactly matches a sequence in the events table of the relational database. As noted above, the events table against which the matching is attempted is populated during packing, based on human annotation of events found in real human conversation transcripts. When appending an observation to an existing event expression in the data model is not possible, the system determines if it can create a new event with the observation then being the initial observation for the new event sequence. In circumstances when a particular observation does not fall neatly within an event expression (i.e., it cannot be used extend the event), or when the observation does not make sense as a new event, the system then provides a fallback (or failover) operation to enable processing to continue efficiently. This fallback operation is referred to herein as event aliasing.

As defined above, event aliasing refers to the notion of inferring which event is unfolding, or has unfolded, with an inexact match. In particular, when an exact sequence is not recognized, preferably a closest inexact match is determined and presented as an alias such that further processing can then be performed as if the closest inexact match was recognized as a known sequence. When an aliased event is created, the system then proceeds to process the alias event as the event being spoofed (and thus no longer sees the inexact match). Aliasing may be carried out either to extend an event (an "aliased extension"), or even to create a new event ("aliasing a new event"). Preferably, and as noted above, the system first tries to extend an event (using an exact match); then, if extending an event fails, the system then determines if it can create a new event (if this can be done logically given the conversation history so far). Once the latter option fails, the system fails over to attempt to generate an aliased extension and, failing that, performs aliasing for a new event. Event aliasing is advantageous, as it enables the system to provide coherent and appropriate responses even when the database lookup does not return exact (or otherwise useful) results. The mechanism enables the system to pretend it has seen a sequence of observations that exactly matches something in the database, when in reality the system observed something very similar but that, e.g. skips an utterance in the middle, re-orders two utterances within the sequence, or the like. Event aliasing enables to system to operate coherently even when there is no exact match for a sequence that can be extended with the most recent observation. In this manner, the sequence is auto-corrected to something that is close enough to what has been observed. This approach ensures that the rest of the system functions efficiently with exact look-ups into tables within the relational database.

The intelligent packing of the relational database, and the use of the data model structured as described, enables the system to participate in a multi-turn conversation, coherently, and quickly. The system has several options for flexibly understanding the meaning of an utterance, where aliasing is the fallback, and where meaning is ascribed based on which observation is seen at which step of an event, within a sequence of events that compose a conversation. Events are of arbitrary length, and they can overlap in time with other events. Thus, and although not depicted in the example event hierarchical representation shown in FIG. 3, multiple events may be active concurrently.

In this example depicted in FIG. 3, two different utterances are indicated as being members of an utterance cluster. Preferably, and mentioned above, the system defines utterance clusters by training a machine learning (ML) classifier.

A conversational bot system 400 that implements the techniques of this disclosure is shown in FIG. 4. The system is configured to process a query (e.g., a user utterance or physical act) within a given turn of the multi-turn conversation. It assumes that the corpus of annotated conversation transcripts is packed into a relational database 402 comprising the set of inter-related tables as shown in FIG. 2. Preferably, these tables include a table of events, a table of observations, a table of physical acts, and a table of speech acts. As will be described, the relational structure includes the pointers (keys) identified, and preferably look-ups in to the database are performed on a constant-time basis such that only a single database query into the data structures is required for each database access (although there are typically several of such accesses as will be described).

At a high level, the system 400 comprises several main components, namely, an event recognition sub-system 404, and an action selection sub-system 406. The event recognition sub-system 404 has several basic functions. Initially, and upon receipt of a new user input, the event recognition sub-system 404 tries to decide how to interpret what was actually said to the bot given what has been observed previously. Typically, an input can be successfully interpreted if two conditions are met: (1) the user's input can be recognized as a speech act or physical act that exists as an observation in the historical data, and (2) this observation can legally extend an event or start a new event, giving contextual meaning to the observation.

As noted above, event recognition is the process of first trying to extend an event, or adding a new event, or (failing those options) performing aliasing. In general, this evaluation is carried out using an initial lookup into the database of historical transcripts to identify one or more candidate interpretations, followed by a filtering of the candidates for coherency (sometimes referred to herein as "coherency filtering"). More formally, a candidate interpretation typically corresponds to some human annotation found in the historical conversation transcripts that were indexed during the packing operation. In one exemplary implementation, the candidate interpretation is a pointer identifying specific lines of historical data in the set of inter-related tables that comprise that relational database 402. Another way of describing a candidate interpretation is as an instance of observations, e.g., one candidate interpretation might be a specific utterance in a specific transcript that expresses the speech act "hello" with the line "hey man nice to see you." Multiple candidate interpretations are identified by a set of pointers to specific lines in the transcripts, representing instances of observations.

Preferably, the input to event recognition sub-system 404, where the system tries to extend an event, etc., is represented as a sequence of observation identifiers (IDs), rather than instances. An ID is akin to a type of observation that may appear many times in the annotated historical data, rather than one instance of an observation with that ID. To take a concrete example, assume the user utterance is "hello kind sir." The classifier is run against the utterance, and in this example the classifier assigns the utterance the speech act label "hello." From this, the system looks up a speech act ID (for this label) from the speech acts table. Then, from this speech act ID, the system looks up an associated observation ID in the observations table. These lookups typically are done at once, through SQL table joins. After determining what observation ID "hello kind sir" maps to, the system tries to use this observation ID to first extend an event. To this end, preferably the data model is updated to reflect that the event is extended (at this point, merely an assumption that the event can be extended), and it is the resulting modified event that the system then uses to perform the initial lookup described above, namely, to fetch the one or more candidate interpretations. These candidate interpretations are instances of observations with the observation ID previously mentioned, e.g., where the system found things like "hello."

In addition to obtaining the one or more candidate interpretations, the event recognition sub-system 404 evaluates the candidate interpretations that it fetches, with the goal of identifying one candidate interpretation that it will then provide to update the data model before that updated model is then provided to the action selection sub-system 406. In this initial pass, the event recognition sub-system 404 functions to attempt to understand the user's input. A mechanism 408 for performing this function preferably comprises a set of evaluation agents that are sometimes referred to herein as "critics." Critics preferably operate over candidate interpretations. As used herein, a critic typically is a software agent (e.g., implemented as a Python class) that evaluates a candidate interpretation against a statistical model, a set of hard-coded rules, or some other data or criteria, in each case to determine whether the candidate interpretation should be used to potentially update the data model. Preferably, there are a plurality of separate and distinct "critics," with each critic providing a particular type of analysis, and a particular candidate interpretation must pass each and every critic. In other words, preferably the critics collectively provide a Boolean AND function such that a candidate interpretation is not accepted for use to update the data model unless all critics are satisfied. Although this approach is preferred, the all-or-nothing criteria may be relaxed. The nature and processing performed by a critic may vary from computationally-simple tasks (e.g., evaluation of business logic), to more complex evaluation tasks (e.g., evaluation against a statistical model). The critics may be arranged sequentially, such that the more computationally-simple tasks are tested before the more complex ones. Critics may also operate in parallel with one another, and one or more critics may be combined into a single critic. In this manner, the critics selectively filter the candidate interpretations so as to ensure that the bot operates coherently and consistently given the conversation so far.

As noted above, event recognition tries to extend an event if it can do so. To this end, and as part of the event recognition function, the critics are executed against the set of candidate interpretations. If this initial pass through the critics returns a positive result, work of the event recognition sub-system is done (for this first pass), as the sub-system has recognized the user's input. If, however, the initial pass through the critics returns empty-handed (i.e., no candidate interpretation survives), then the event recognition sub-system tries to assign a new event. The new event is a new instance of an event that will initially have only one observation in it, namely, a candidate interpretation that makes it through the critics. To this end, a second pass through the critics is performed. This second pass may or may not identify a candidate interpretation. If a candidate interpretation passes the critics, it is used for the new event. If, however, evaluation of the new event also returns empty-handed (i.e., no candidate interpretation logically starts a new event), the routine then continues by moving on to event aliasing. As noted above, first the system tries an aliased event, where the system allows an aliased addition, namely, where a new instance of an event is started at a position in the conversation where the system has not seen (in the historical data) that kind (label) of event start. Once again, the critics are run again in an attempt to find a candidate interpretation. Processing efficiencies are provided by caching results of the critic evaluations where possible. The result of this iterative process (trying first to extend an event, or start a new event, or aliasing an event, etc.) is a given candidate interpretation, and processing then continues at the action selection sub-system 406.

To this end, the given candidate interpretation identified by the event recognition sub-system is applied to the data model to produce an adjusted data model. As used herein, adjusting the data model may involve an addition to the data model, or not rolling back a change (which typically occurs when a candidate interpretation is rejected by a critic). The adjusted data model is then applied as an input to the action selection sub-system 406, whose primary function is to propose what observations might come next. To this end, action selection sub-system 406 tries different ways of navigating the transcript data to come up with a set of one or more such observation(s) that might logically come next. An observation identified by the action selection sub-system represents a component of an imagined future state of the conversation. Preferably, the action selection sub-system does not evaluate correctness (coherency) of the observation. Instead, and as described below, action selection sub-system 406 hands the observations (in particular, their observation IDs) that it identifies back to the event recognition sub-system 404, which then repeats its above-described operations(s) to evaluate correctness (coherence filtering). Thus, and according to this disclosure, the event recognition sub-system is used to both understand the user, and to select a response to return to the user.

The action selection sub-system 406 preferably operates as follows. Taking the adjusted (modified) data model as input, it performs an additional database lookup pass through the historical transcripts in the database 402, and in response generates a set of next possible observations. If these observations were to be applied to the data model, the resulting data model would represent one or more imagined future states of the conversation. As such, this set of observations represents possible responses that might be returned by the bot (as a response to the new user input). The action selection sub-system 406 then iterates over different ways (strategies) to suggest what observation(s) could come next, and it returns a resulting set of observation IDs (corresponding to the identified observations) back to the event recognition sub-system 404, thereby re-cycling them back through the coherency filtering process to test their coherency. Using the set of observation IDs proposed by the action selection sub-system, the event recognition sub-system 404 again tries to extend the event, etc., once again performing a query into the database for candidate interpretations. The above-described processing by the event recognition sub-system 404 is then repeated. In particular, the critics in the event processing sub-system 404 are then run over the candidate interpretations to find one single approved candidate (an instance). At this point the system has found a coherent response to the user input, the data model is adjusted to include it, and this response is then selected to be returned.

Preferably, the action selection sub-system 406 includes a mechanism 410 to identify the set of observations. Akin to the critics in the event recognition sub-system 404, the mechanism 410 comprises a set of evaluation agents that are sometimes referred to as "action selectors." As used herein, an action selector typically is a software agent (e.g., once again implemented as a Python class) that provides a strategy for navigating through the transcript data. Preferably, there are a plurality of separate and distinct "action selectors," with each action selector providing a particular strategy for navigating through the transcript data. The nature and processing performed by an action selector may vary from computationally-simple tasks, to more complex evaluation tasks. A simple action selector just tries whatever came next in one particular log. A more complicated action selector tries to find ways to complete events that are otherwise hanging open. Or, a selector might try to urge the bot to start an event that will capture some variable value that the bot knows it needs. These are just example action selectors. As the action selection sub-system iterates over its action selectors, one or more observations (of what might come next) are identified and sent back over to the event recognition sub-system, as previously noted. Once an action selector has found an observation that is then approved via event recognition, the operation of the action selection sub-system ends.

In operation, action selectors may be arranged sequentially, such that the more computationally-simple tasks are tested before the more complex ones. Action selectors may also operate in parallel with one another, and one or more action selectors may be combined into a single action selector. Preferably, as an action selector identifies a possible observation that could come next, it is returned to the event recognition sub-system for filtering, even as other action selectors are still executing. In another embodiment, all of the action selections are enabled to complete their processing before the resulting one or more observations are returned (in effect, in batch) back for filtering Critics and action selectors may be the same or distinct software agents. By way of example, the following agents apply to both event recognition and action selection:

CriticStaleExtension—after some number of conversational turns have passed, it becomes unlikely that something someone just said is supposed to be interpreted as an extension of something said long ago in the conversation. This critic rejects an interpretation that tries to extend an event that has not changed in the recent several turns.

CriticExtendedEventTypeChange—sometimes extending an event with one more observation changes the label (and thus the meaning) of that event. The system needs to be careful about allowing a semantic shift like this. If the original event was not an alias, and changing the event label leaves it in a position in the conversation history where this ordering of events has not been observed, then the label change (via the event extension) that would lead to this unfamiliar ordering of events is not allowed.

ActionSelectorContinueLog—this is the simplest action selector. Every time critics approve a candidate interpretation, the system records in the data model which line of which transcript that candidate pointed at. This action selector blindly proposes that the next thing to say is whatever was said next in that particular transcript.

ActionSelectorCompleteEvent—this action selector detects that the data model contains one or more events that cannot yet be considered complete—they still require extension with more observations before they represent a whole instance of that event. This action selector proposes the bot say (or do) something next that would be the next step in extending some existing event, to get it closer to completion. For example, if someone asked the bot "how are you today?", that begins an event that is not complete until the bot responds with "I'm well."

ActionSelectorMotivation—this action selector encourages the bot to say something that prompts the user to answer with some missing piece of qualifying information (e.g., in the context of qualifying sales leads). For example, the bot is aware that it still needs to know how many employees work for some company, so if the simpler action selectors fail, it tries to move the conversation forward productively.

The following agents are only used during action selection:

CriticDuplicateUtternance—prevents the bot from saying the exact thing it has said previously within the same session;

CriticBizrule—prevents the bot from saying something that contradicts some piece of business logic. For example, this agent ensures that the bot does not say "sure, we will connect you to one of our sales reps right away!" if the system has already detected that this user's company is in an industry or geographic location that is not being serviced. After the critic rejects this candidate bot response, it moves on to another candidate that will get approved that might say "sorry, we don't offer service in your location. Would you like to join our waiting list to be notified when coverage is extended?" or the like.

The above example agents are not intended to be limiting.
Enabling Technologies

Typically, the computing platform is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Preferably, the platform supports a machine learning system. The nature and type of Machine Learning (ML) algorithms that are used to process the query may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks. As will be described, the techniques herein preferably leverage a network of neural networks. Formally, a NN is a function g: $X \rightarrow Y$, where X is an input space, and Y is an output space representing a categorical set in a classification setting (or a real number in a regression setting). For a sample x that is an element of X, $g(x)=f_L(F_{L-1}(\ldots((f_l(x))))$. Each $f_l$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Thus, for example, in one embodiment, and without limitation, a neural network such as described is used to extract features from an utterance, with those extracted features then being used to train a Support Vector Machine (SVM).

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

For supervised learning, the following steps are used. An initial determination is what kind of data is to be used as a training set. The training set is then gathered. In particular, a set of input objects is gathered and corresponding outputs are also gathered, either from human experts or from measurements. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Other enabling technologies for the machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LS™), Random Forests, Generalized Linear Models, Extreme Gradient Boosting, Extreme Random Trees, and others. By applying these modeling techniques, new types of features are extracted, e.g., as follows: model parameters (e.g. coefficients for dynamics, noise variance, etc.), latent states, and predicted values for a next couple of observation periods.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology or technical field, as well as the specific technological improvements to various fields, all as described above.

The above-described solution may be implemented across various use cases. A representative (but non-limiting) use case is a chatbot that is used as an alternative to a human Sales Development Representative (SDR) to help an organization scale to handle a larger volume of traffic that a sales team can support, and to handle conversations at off-hours or otherwise when no humans are standing by or available.

Although the above-described workflow is described in the context of a chat, this is not a limitation. Generalizing, the multi-turn conversation is one of: chat, e-mail, SMS and a voice-based interaction.

What is claimed is as follows:

1. A method to provide query understanding to select a response in a multi-turn conversation between a user and a conversational bot, the conversation composed of a set of events, wherein an event is composed of a linear sequence of observations that represent an expression of the event, comprising:

organizing a corpus of annotated conversation transcripts into a relational database comprising a set of inter-related tables, the tables including at least a table of events, and a table of observations;

in response to initiation of the multi-turn conversation, instantiating a data model;

as the multi-turn conversation proceeds, persisting in the data model a conversation history between the user and the bot, the data model comprising an observation history, together with a set of events that have been determined to represent the conversation up to at least one turn;

in response to receipt of a new input by the user that is one of: a speech act, and a physical act, determining a response to the new input:

processing the new input to generate a result, and mapping the result to an observation in the data model;

using the mapped observation as a key, performing a first look-up into the set of inter-related tables to retrieve a set of candidate interpretations given the conversation up to the at least one turn, wherein a candidate interpretation is one that either extends an event or starts a new event;

when a given one of the set of candidate interpretations is determined to extend an event in the set of events, appending the mapped observation to the event to create an extended event;

when an extended event cannot be created but a given one of the set of candidate interpretations is determined to start a new event that has the mapped observation as its initial observation, adding the new event to the set of events;

when no candidate interpretation extends an event or logically starts a new event by an exact match to an existing event in the annotated historical transcripts, creating an aliased event by identifying one other event whose event expression is an approximate match to an existing event in the annotated historical transcripts;

when a given one of the set of candidate interpretations is determined to extend the one other event, appending the mapped observation to the one other event to create an extension of the aliased event;

when the extension cannot be created for the aliased event, creating a new aliased event having the mapped observation as its initial observation, the new aliased event being associated with a sequence of events that has not been seen in the annotated historical transcripts; and using one of: the extended event, the new event, the aliased event as extended, and the new aliased event, as a key, performing a second look-up into the set of inter-related tables to retrieve the response.

2. The method as described in claim 1 further including updating the set of events in the data model to include one of: the extended event, the new event, the aliased event as extended, and the new aliased event.

3. The method as described in claim 1 wherein the response is one or more possible next observations, and further including validating the one or more possible next observations to determine a possible next observation to return to the user.

4. The method as described in claim 3 further including returning a validated possible next observation to the user.

5. The method as described in claim 1 wherein the set of events in the data model are organized into a hierarchy.

6. The method as described in claim 4 wherein the one or more tables include a speech act table, and a physical act table.

7. The method as described in claim 1 wherein the new input is a sequence of words that is grammatically complete.

8. The method as described in claim 1 wherein at least one of the first and second look-ups is a constant-time look-up to retrieve a set of candidate interpretations is a single database query.

9. The method as described in claim 1 wherein the given one of the set of candidate interpretations is determined to extend an event in the set of events when appending the identified observation creates a new sequence of observations that exactly matches an existing event expression.

10. The method as described in claim 1 wherein the given one of the set of candidate interpretations is determined to extend an event in the set of events by filtering the candidate interpretations for coherence.

11. The method as described in claim 1 wherein the multi-turn conversation is one of: chat, e-mail, SMS and a voice-based interaction.

12. The method as described in claim 1 wherein the new input is speech, and processing the new input includes:

using a statistical model to associate the new input to a cluster of utterances;

identifying a speech act associated to the cluster of utterances, together with an actor; and mapping the observation from the identified speech act and the identified actor.

13. A software-as-a-service computing platform, comprising:

computing hardware;

computer software executing on the computer hardware, the computer software comprising computer program instructions executed on the computing hardware and configured as a network-accessible front end component, together with an Application Programming Interface (API)-accessible back-end system, the back-end system configured to provide query understanding to select a response in a multi-turn conversation between a user and a conversational bot, the conversation composed of a set of events, wherein an event is composed of a linear sequence of observations that are user speech or physical actions and that represent an expression of the event, the back-end system being shared across concurrent multi-turn conversations and comprising:

a corpus of annotated conversation transcripts organized into a relational database comprising a set of inter-related tables, the tables including at least a table of events, and a table of observations;

a data model instantiated in response to initiation of each multi-turn conversation;

program code operative as the respective multi-turn conversation proceeds to persist in the data model a conversation history between the user and the bot, the data model comprising an observation history, together with a set of events that have been determined to represent the conversation up to at least one turn, and wherein one or more events are active concurrently;

program code operative in response to receipt at the front-end component of a new input by the user that is one of: a speech act, and a physical act, to determine a response to the new input using information derived from the data model and a first look-up into the relational database that returns a set of candidate interpretations given the conversation up to the one turn, wherein the program code is further operative (i) to determine whether a candidate interpretation in the set extends an event or logically starts a new event; (ii) when no candidate interpretation in the set extends an event or logically starts a new event, to identify one other event whose event expression is an approximate match to an existing event, the other event being an aliased event; (iii) when a candidate interpretation extends the one other event, to create an extension of the aliased event; (iv) when the extension cannot be created for the aliased event, create a new aliased event; and (v) using one of the aliased event as extended, and the new aliased event, as a key, performing a second look-up into the relational database to obtain the response to the new input; and program code to return the response to the front-end component for delivery to the user.

14. The computing platform as described in claim 13 wherein the program code to determine the response comprises:

program code configured to process the new input to generate a result, and to map the result to an observation in the data model; and program code configured to use the mapped observation as a key to perform the first look-up into the set of inter-related tables, thereby retrieving the set of candidate interpretations given the conversation up to the one turn.

15. The computing platform as described in claim 14 further including program code to update the set of events in the data model to include one of: the extended event, the new event, the aliased event as extended, and the new aliased event.

16. The computing platform as described in claim 14 wherein the response is one or more possible next observations, and further including program code to validate the one or more possible next observations to determine a possible next observation to return to the user.

17. The computing platform as described in claim 16 further including program code to return a validated possible next observation to the front-end component.

18. A method for query processing against a set of annotated conversations that are organized as a set of inter-related data tables, the query arising during a multi-turn conversation between a user and a conversational bot and that is composed of a set of events, wherein an event is composed of a linear sequence of observations that are user speech or physical actions and that represent an expression of the event, and wherein events and observations are stored in distinct tables, comprising:

as the multi-turn conversation proceeds, persisting a data model comprising an observation history, together with a set of events that have been determined to represent the conversation up to at least one turn;

receiving from a user a new input; and providing a response to the new input, wherein the response is determined by:

performing event recognition on the new input against events and observations stored in the set of inter-related data tables to attempt to identify a meaning associated with the new input, wherein attempting to identify a meaning includes ordered sub-steps of (i) performing a first look-up into the set of inter-related data tables that returns a set of candidate interpretations given the conversation up to the one turn, (ii) determining whether a candidate interpretation in the set extends an event or logically starts a new event; (iii) when no candidate interpretation in the set extends an event or logically starts a new event, identifying one other event whose event expression is an approximate match to an existing event, the other event being an aliased event, (iv) when a candidate interpretation extends the one other event, creating an extension of the aliased event; (v) when the extension cannot be created for the aliased event, creating a new aliased event;

approving a candidate interpretation;

based on the approved candidate interpretation, updating the data model;

based on the updated data model, using at least one of the extension of the aliased event and the new aliased event as a second look-up into the set of inter-related data tables to identify a set of one or more observations for the conversational bot to present to the user; and performing event recognition on the set one or more observations to select the response.

19. The method as described in claim 18 further including returning the response to the user.

* * * * *